UNITED STATES PATENT OFFICE.

W. M. WATSON, OF TONICA, ILLINOIS.

IMPROVED METHOD OF TREATING GRAIN FOR THE MANUFACTURE OF ALCOHOL.

Specification forming part of Letters Patent No. 51,369, dated December 5, 1865.

*To all whom it may concern:*

Be it known that I, W. M. WATSON, of Tonica, in the county of La Salle and State of Illinois, have invented a new Method of Distilling Grain; and I do hereby declare that the following is a full, clear, and exact description of the same.

The object of my invention is to improve the present process of distilling grain, or the method of obtaining alcohol therefrom, in a manner that will prevent the sealing up of the outside of the globules of starch contained in the broken particles of grain used during the process of scalding the same.

That others may know how to use my invention, I will describe the method of using the same.

First I grind the grain in the usual manner, and employ the use of the improved apparatus, such as the mash-tub, fermenting-tub, still, &c., used in the common distilling process, with the addition of the common kiln-drier, or any other means that will heat meal.

In the ordinary method of distilling, the meal is first brought to a heat equal to about one hundred and sixty degrees (160°) by means of hot water. Steam is then applied and the heat in the mash is raised to about 210°, (two hundred and ten degrees,) or any desired point below the boiling-heat of water. In this process it is impossible to bring the steam in contact with the meal in the mash-tub without subjecting some portion of the same to the heat of 212°, (two hundred and twelve degrees,) or more, which will seal the outside of the globules of starch, so that water will not again penetrate the same, thus preventing the distilling of the proper quantity of alcohol from the meal.

But in my process I obviate this difficulty of treating in the following manner: I kiln-dry or heat the meal to 210°, (two hundred and ten degrees,) or any desired point below boiling water. I then mix the meal in a convenient mixer or mash, containing water heated to 210°, (two hundred and ten degrees,) by which means all of the particles or globules of starch are dissolved without the possibility of overheating any part of the meal or sealing up the starch in the same.

Experience has demonstrated that alcohol cannot be conveniently obtained from grain except by a high heat, and if the grain or meal is brought to over 212° that a chemical change takes place which prevents the same from producing the requisite amount of alcohol.

It will be seen from the description of the two processes above set forth that my arrangement of heating the meal in the kiln and dispensing with steam renders my invention better adapted for distilling purposes.

Having described my mode of distilling, what I claim as my invention is—

The heating of the meal, as set forth, and mixing the same with hot water for the purpose of dissolving the starch, as set forth, and for the purpose described.

W. M. WATSON.

Witnesses:
GEO. L. CHAPIN,
A. HAYWARD.